(12) United States Patent
Hues

(10) Patent No.: US 7,905,310 B2
(45) Date of Patent: Mar. 15, 2011

(54) ALL-TERRAIN POWERED VEHICLE AND METHOD OF STEERING

(76) Inventor: Peter James Hues, San Jose, CA (US)

(*) Notice: Subject to any disclaimer, the term of this patent is extended or adjusted under 35 U.S.C. 154(b) by 903 days.

(21) Appl. No.: 11/788,155

(22) Filed: Apr. 19, 2007

(65) Prior Publication Data

US 2008/0257627 A1 Oct. 23, 2008

(51) Int. Cl.
*A63C 5/08* (2006.01)
*B62B 13/00* (2006.01)
(52) U.S. Cl. .................. 180/180; 280/14.22; 280/14.25
(58) Field of Classification Search .................. 180/180, 180/181, 182, 184; 280/14.21, 14.22, 14.25
See application file for complete search history.

(56) References Cited

U.S. PATENT DOCUMENTS

| | | | | |
|---|---|---|---|---|
| 3,146,840 A * | 9/1964 | Walsh | ............................ | 180/180 |
| 3,204,263 A * | 9/1965 | Bash | ............................... | 441/72 |
| 3,794,131 A * | 2/1974 | Freedman et al. | ............ | 180/184 |
| 3,809,173 A * | 5/1974 | McLeod | ........................ | 180/181 |
| 3,828,872 A * | 8/1974 | Tsuchiya et al. | .............. | 180/190 |
| 4,162,088 A * | 7/1979 | Best et al. | ...................... | 280/606 |
| 4,234,050 A * | 11/1980 | Condon | ........................ | 180/190 |
| 4,307,788 A * | 12/1981 | Shelton | ......................... | 180/181 |
| 4,502,560 A * | 3/1985 | Hisatomi | ....................... | 180/190 |
| 4,600,073 A * | 7/1986 | Honett | ........................... | 180/181 |
| 4,633,964 A * | 1/1987 | Boyer et al. | ................... | 180/190 |
| 4,984,648 A * | 1/1991 | Strzok | ........................... | 180/181 |
| 5,305,846 A * | 4/1994 | Martin | ........................... | 180/181 |
| 5,411,282 A * | 5/1995 | Shannon | ........................ | 280/606 |
| 5,518,080 A * | 5/1996 | Pertile | ........................... | 180/190 |
| 5,568,840 A * | 10/1996 | Nagata et al. | ................... | 180/190 |
| 5,613,695 A * | 3/1997 | Yu | ................................. | 280/14.25 |
| 5,662,186 A * | 9/1997 | Welch | ............................ | 180/181 |
| 5,738,361 A * | 4/1998 | Landucci | .................... | 280/12.14 |
| 5,927,735 A * | 7/1999 | Hosoda | ..................... | 280/87.042 |
| 5,975,229 A * | 11/1999 | Hosoda | .......................... | 180/181 |
| 6,105,983 A * | 8/2000 | Will | ........................... | 280/93.514 |
| 6,193,003 B1 * | 2/2001 | Dempster | ...................... | 180/180 |
| 6,260,648 B1 * | 7/2001 | Bessette | ........................ | 180/184 |
| 6,341,786 B1 * | 1/2002 | Kermis | ...................... | 280/14.22 |

(Continued)

FOREIGN PATENT DOCUMENTS

EP 0776682 2/2002

(Continued)

OTHER PUBLICATIONS

PCT international Search Report and the Written Opinion of the International Searching Authority, or the Declaration issued in related international application PCT/US2008/060963.

*Primary Examiner* — J. Allen Shriver
*Assistant Examiner* — Jacob Meyer
(74) *Attorney, Agent, or Firm* — Marsdon Q. McQuay

(57) ABSTRACT

A steering mechanism for a recreational vehicle includes a foot support and a steering device connected to the foot support, the steering device being moved by a motion of the foot support. A recreational vehicle is also disclosed that includes a front portion, a body connected to the front portion, a track mechanism disposed in the body, a steering mechanism disposed in the front portion, and a foot support disposed between the front portion and the body, the steering mechanism being steered by a motion of the foot support. A method of steering the recreational vehicle is also disclosed.

33 Claims, 12 Drawing Sheets

U.S. PATENT DOCUMENTS

| | | | |
|---|---|---|---|
| 6,435,290 B1* | 8/2002 | Justus et al. | 180/9.1 |
| 6,648,348 B2* | 11/2003 | Link | 280/14.25 |
| 6,698,540 B1* | 3/2004 | Decker, Jr. | 180/181 |
| 6,725,959 B1* | 4/2004 | Shea et al. | 180/190 |
| 6,929,267 B2* | 8/2005 | Sullivan et al. | 280/14.28 |
| 7,040,634 B1* | 5/2006 | Elkins, Jr. | 280/14.25 |
| 7,318,591 B2* | 1/2008 | Landry | 280/14.21 |
| 7,434,644 B2* | 10/2008 | Wier | 180/180 |
| 7,475,751 B2* | 1/2009 | Pard et al. | 180/190 |
| 7,686,109 B2* | 3/2010 | Brazier | 180/9.44 |
| 2002/0050693 A1* | 5/2002 | Link | 280/14.25 |
| 2004/0231578 A1* | 11/2004 | Kurze | 114/55.56 |
| 2005/0167950 A1* | 8/2005 | Martin et al. | 280/618 |
| 2005/0183899 A1* | 8/2005 | Polakowski et al. | 180/193 |
| 2005/0205320 A1* | 9/2005 | Girouard et al. | 180/190 |
| 2006/0232028 A1* | 10/2006 | Pard et al. | 280/22.1 |
| 2009/0236164 A1* | 9/2009 | Almazan | 180/190 |

FOREIGN PATENT DOCUMENTS

| | | |
|---|---|---|
| WO | WO9636405 | 11/1996 |

* cited by examiner

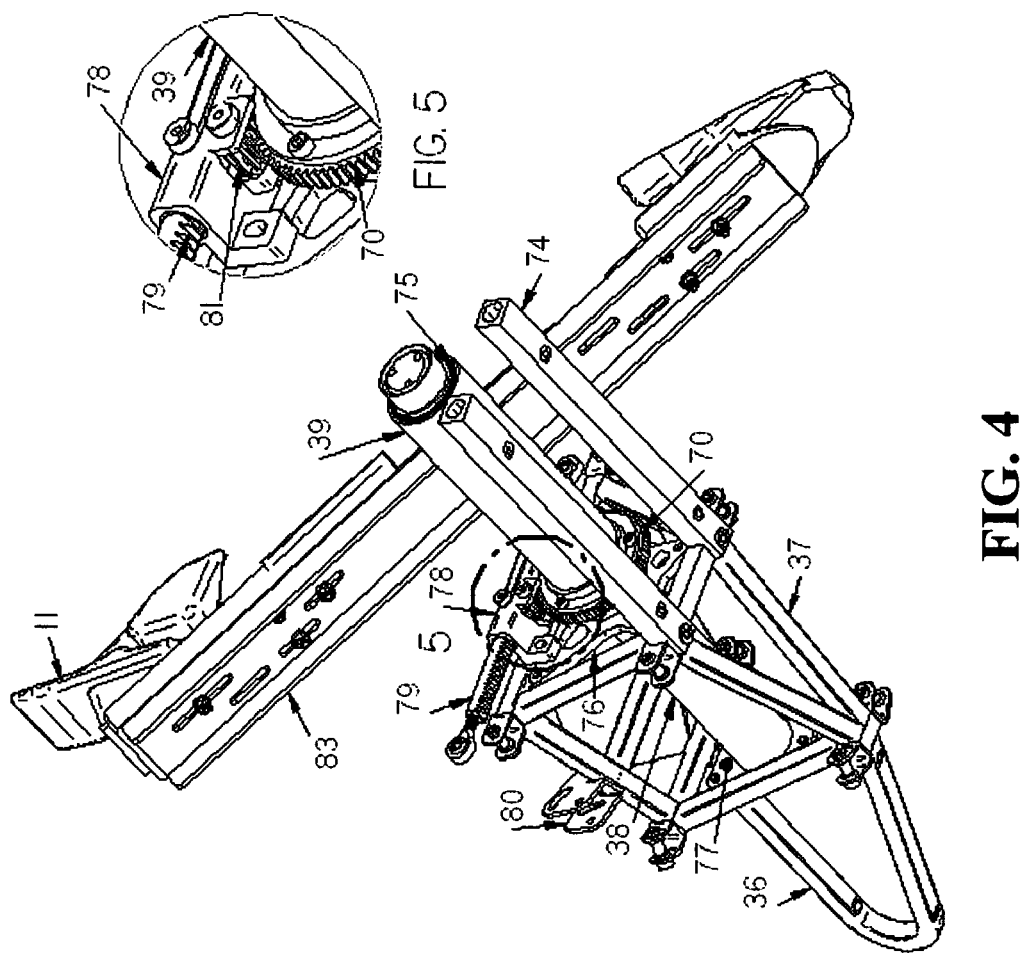

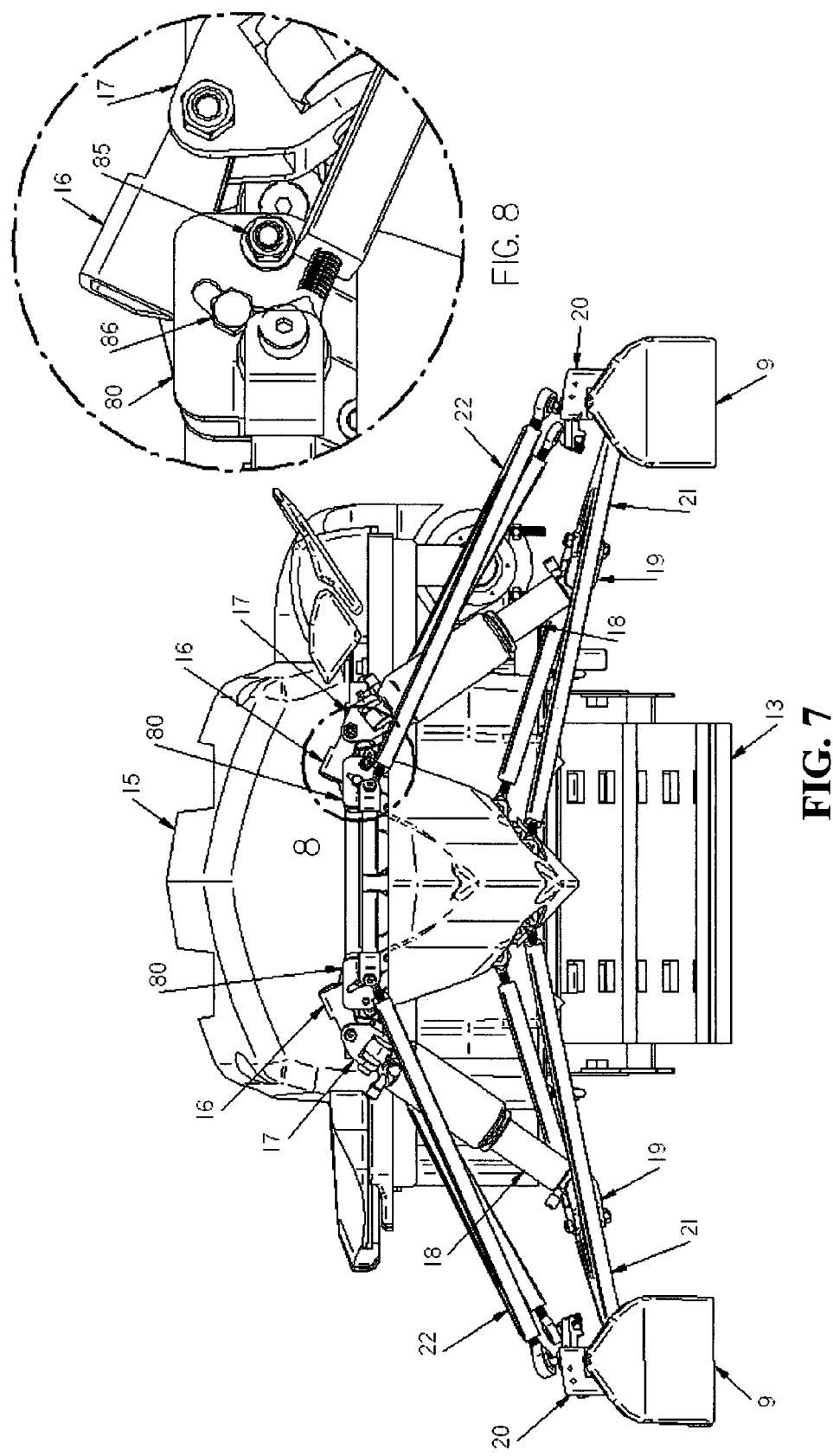

ALL-TERRAIN POWERED VEHICLE AND METHOD OF STEERING

BACKGROUND OF THE INVENTION

1. Field of the Invention

The present invention relates to a recreational vehicle and, more particularly, to an all-terrain, powered vehicle with foot-driven steering and to a method of steering related thereto.

2. Description of the Related Art

There exist many powered units that attempt to emulate gravity-driven recreational devices so as to extent their range of operation and to eliminate the need to pay expensive fees for entertainment. Consider, for example, but not as a limitation of the invention disclosed herein, motorized sled- or ski-type vehicles disclosed in U.S. Pat. Nos. 4,307,788 and 5,568,840, and motorized snowboards disclosed in U.S. Pat. Nos. 6,725,959, 6,698,540, 6,435,290 and 5,662,186, to name a few.

Each of the '540, '959, and '186 patents depicts a motorized ski vehicle having a power-driven endless track at the rear of the vehicle and a modified snowboard at the front. The user faces in the direction of travel, while standing in a location above, or in front of the power-driven endless track. Each of these disclosed vehicles allows the user to ride in a predominately standing position with the user's side facing in the direction of travel. Turning is accomplished in a similar manner as that employed when riding a snowboard, with the user leaning into turns. The '959 vehicle incorporates an upright tiller for throttle, braking, and assistance with turning while the '540 and '186 vehicles control throttle and braking through the use of a hand-held device connected to the vehicle through a flexible conduit. All of these three vehicles perform poorly when faced with steep slopes or deep powder. With the rider's weight supported mostly or entirely by the board, their tracks tend to dig out snow in less than ideal conditions, thereby loosing traction. The '959, '540, and '186 vehicles rely partially or fully upon heavily modified snowboards for turning and stability; however, these modifications (which include stiffening the board with one or more attachment plates and removing the tail and some of the rear portions of the board or removing a large section of the board and substituting the same with a tracked device while adding an angled region to the board) substantially degrade the turning ability of the board by reducing the effective edge length, increasing the rigidity, and reducing or eliminating the camber of the board. With the power units of the '959 and '540 vehicles being flexibly mounted to the rear of the device, jumping is not recommended due to the potential for the power unit to become damaged upon landing or to cause injury to the user in the case of a fall.

The '788 patent discloses a motorized "stand-up" snow vehicle with a frame and a forward steering ski controlled by a steering unit that extends to a height above the frame sufficient to be grasped by a standing operator. The steering unit is a vertical steering rod causing turning to the right when its upper end is moved to the right. The '840 patent discloses a step floor for a small snowmobile that includes a pair of upright portions provided on opposite sides of a floor on which a driver stands. By locating the track predominately under the user's feet, the '788 and '840 devices are able to traverse steeper slopes and deeper powder than the devices described in the '540, '959 and '186 patents. However, with rigid, predominately vertical members in the front for turning and stability, the '788 and '840 devices can be particularly unsafe for aggressive riding styles and/or if the devices are taken over jumps due to the potential for the user to become tangled in the vertical member during a fall. In addition, the '778 and the '840 devices lack in versatility and maneuverability because of the combination of the forward facing position of the user, high relative weight, only a loose connection between the user and the device, and a steering system that is predominately decoupled from the lean of the user's body.

The '290 device is a personal tracked vehicle with a flexible central frame member that extends from a large front roller to a smaller rear roller and is encircled by a flexible looped belt having projecting treads. An engine mounted above the belt drives the front roller and two bogie wheels engage the belt within valleys formed in the treads. Two boot supports are fixed to the central frame member that support the feet of a standing rider. Rollers fixed to the central frame member support the belt as it travels around the frame. As stated in the '290 patent, the minimal extent of the frame outside the belt exposes a substantial length of the belt edge to engagement with the ground, as well as the stiff lips of the rollers, making it possible to control the vehicle by twisting and tipping However, because the belt edge cannot flex like a snowboard and does not include a side cut as snowboards do, the '290 vehicle cannot be controlled in a manner similar to that of a snowboard, since the board flexibility and side cut are predominant factors governing the maneuverability of a snowboard.

It would therefore be desirable to develop a powered recreational vehicle with increased maneuverability, functionality, and range of operation that will address the noted deficiencies of conventional devices and others known by those of ordinary skill in the applicable arts based on their consideration of the subject matter disclosed herein.

BRIEF SUMMARY OF THE INVENTION

One or more of the above-summarized needs and others known in the art are addressed by a steering mechanism for a recreational vehicle that includes a foot support and a steering device connected to the foot support, the steering device being configured to be moved by a motion of the foot support.

In another aspect of the disclosed invention, a recreational vehicle includes a front portion, a body connected to the front portion, a track mechanism disposed in the body, a steering mechanism disposed in the front portion, and a foot support disposed between the front portion and the body and connected to the steering mechanism, the steering mechanism being steered by a motion of the foot support.

In yet another aspect of the disclosed invention, a recreational vehicle includes a front portion, a body connected to the front portion, a track mechanism disposed in the body, a foot support disposed between the front portion and the body, and means for steering the recreational vehicle.

A method of steering a recreational vehicle is also within the scope of the embodiments of the invention disclosed. Such a method includes moving a first foot support of the recreational vehicle, the first foot support being connected to a steering mechanism of the recreational vehicle. The moving of the first foot binding including either a rotation of the first foot support about an axis substantially perpendicular to a longitudinal axis of a steering device of the steering mechanism or a translation along an axis substantially parallel to a longitudinal axis of the steering device of the steering mechanism.

The above brief description sets forth features of the present invention in order that the detailed description that follows may be better understood, and in order that the present contributions to the art may be better appreciated.

There are, of course, other features of the invention that will be described hereinafter and which will be for the subject matter of the appended claims.

In this respect, before explaining several preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 illustrates a detail perspective view showing a steering mechanism of the powered vehicle of FIG. 1;

FIG. 5 illustrates a close-up view of the steering mechanism of FIG. 4;

FIG. 7 illustrates a front view of the powered vehicle with body work and ride-height adjustment in accordance with yet another embodiment of the disclosed invention;

FIG. 8 illustrates a close-up view of the ride-height adjustment of FIG. 7;

DETAILED DESCRIPTION OF THE PREFERRED EMBODIMENTS

Figure 1:
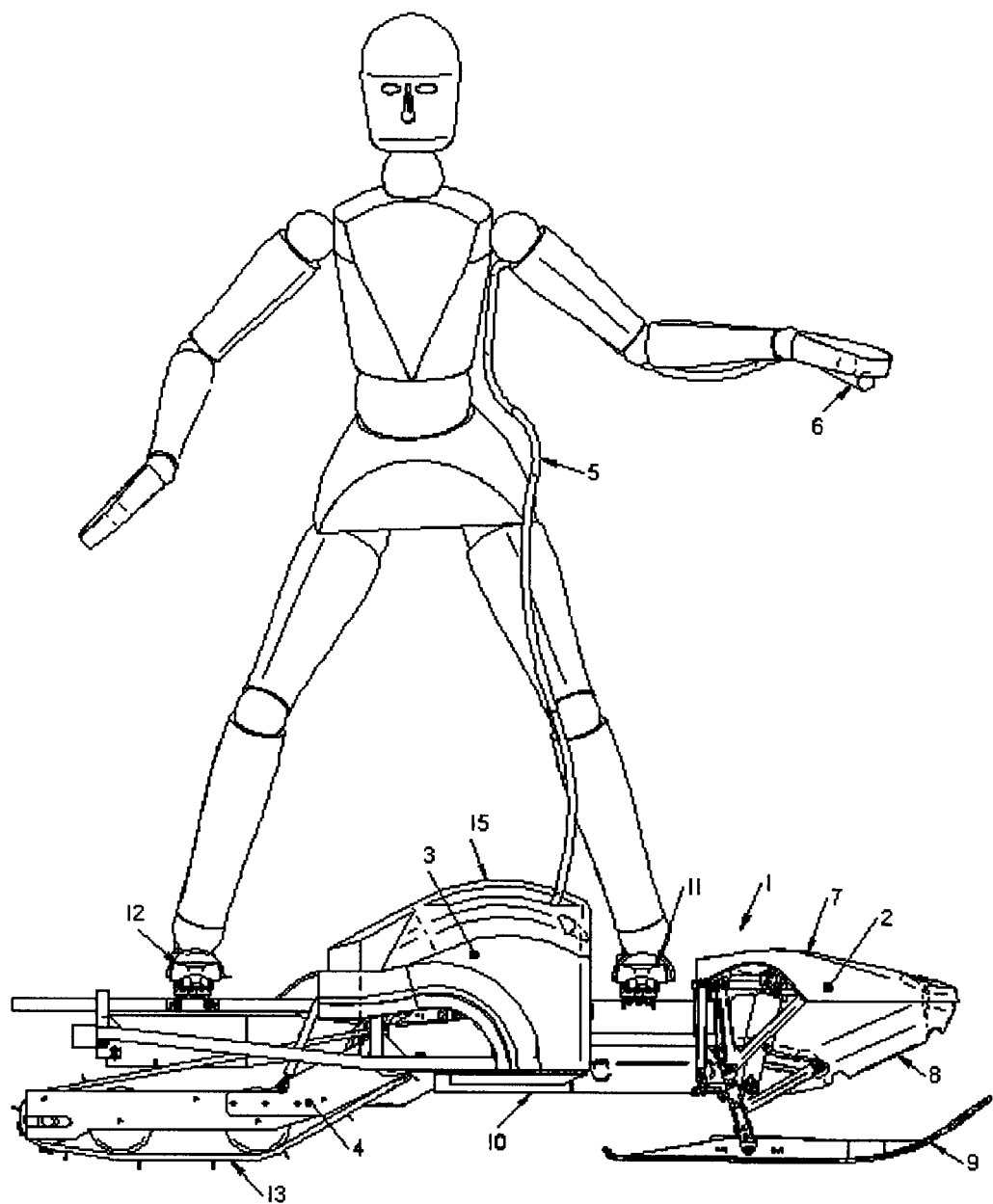
FIG. 1 illustrates a side view of a powered vehicle in accordance with an embodiment of the present invention.

Referring now to the drawings, wherein like reference numerals designate identical or corresponding parts throughout the different views, several embodiments of the disclosed invention will be described. A powered vehicle 1 in accordance with the disclosed invention is shown schematically in FIGS. 1-4. It should be noted that all figures provided herein are simply illustrations of the invention and have not been drawn to scale. FIG. 1 illustrates a side view of the powered vehicle 1 in accordance with an embodiment of the present invention, FIG. 2 illustrates a perspective view of an underside of the powered vehicle 1 of FIG. 1 with body work, FIG. 3 illustrates a perspective view of a top of the powered vehicle 1 of FIG. 1 with body work, and FIG. 4 illustrates a detail perspective view showing a steering mechanism of the powered vehicle 1 of FIG. 1.

As illustrated in FIG. 1, the powered vehicle 1 includes a front portion 2 having a front fender 7, a power unit 3 enclosed by a body 15, a skid plate 10, a track mechanism 4 that includes a track 13, and front and rear foot supports 11 and 12 configured to connect user's boots (not shown) to the powered vehicle 1. As understood by those of ordinary skill in the art, conventional ski bindings may be used; however, custom bindings and boots, designed for the specific needs of this application, may also be used. In addition, as used herein, a foot support is an expression covering a broad range of devices, including, but not being limited to, safety-release, locking bindings similar to those used on conventional skis, straps used to secure the user's boots in a manner similar to those used on conventional snowboards, step-in, locking bindings similar to those used on conventional snowboards, malleable bands that extend partially over the user's boots with or without a high-friction surface similar to a stomp pad used on snowboards, and flat plates with or without vertical sections around the perimeter thereof used with or without a high-friction surface similar to a stomp pad used on snowboards, and combinations thereof.

Throttle, braking, manual binding-release, and motor stop functions are controlled through a hand-held control 6, which is connected to the device through a flexible cable 5. Alternately, the hand-held control may control throttle, braking, manual binding release, and motor stop functions via wireless technology, whereby the hand-held control is a wireless remote. The motor stop function of the hand-held control 6 may be configured such that the motor will be caused to stop should the user drop the hand-held control. In the wireless embodiment of the hand-held control, the motor stop function may be configured such that the motor may be caused to stop and/or braking to be applied should the user drop the wireless hand-held control, and/or should the hand-held control become separated from the device by more than a preset (or user defined) distance, and/or should the batteries in the hand-held remote become low in power, and/or should the communication between the wireless hand-held remote and the device become compromised for any reason. Alternately or additionally, the motor stop function may be tied to one or both foot mounts and/or the user's leg(s) such that the motor is caused to stop should the user become partially or completely detached from the device. The flexible cable 5 may be attached to multiple points of the user's body with hook-and-loop fasteners, clips, or other quick-disconnect devices. The flexible cable 5 may also be used to transfer forces from the user to the device during acceleration or deceleration, depending upon the connection point of the cable to the device. Optionally, the hand-held control 6 may be combined with wireless technology to control the throttle, braking, manual binding-release, and motor stop functions without a cable connecting the hand-held control 6 to the vehicle.

Figure 2:
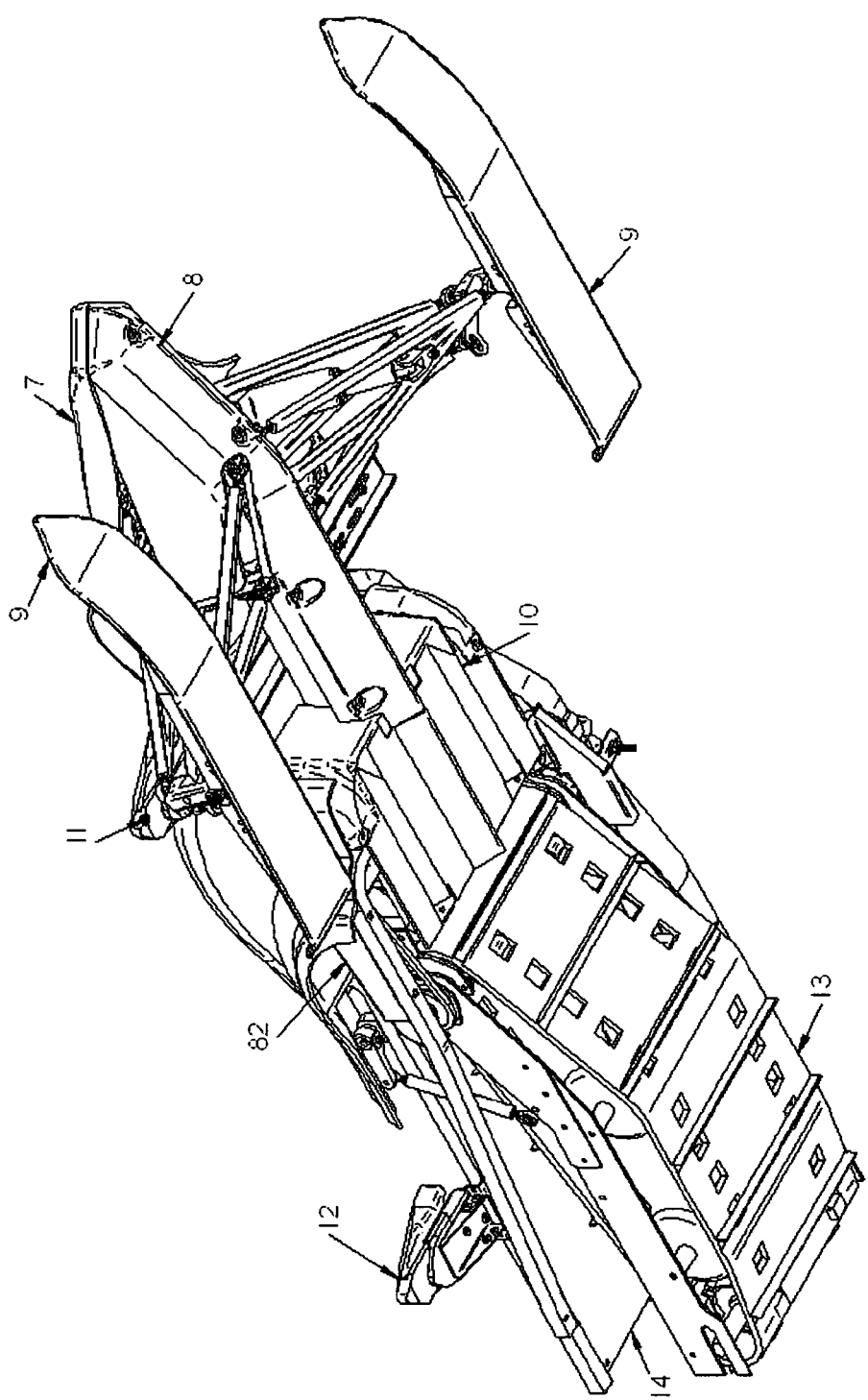
FIG. 2 illustrates a perspective view of an underside of the powered vehicle of FIG. 1 with body work.
Figure 3:
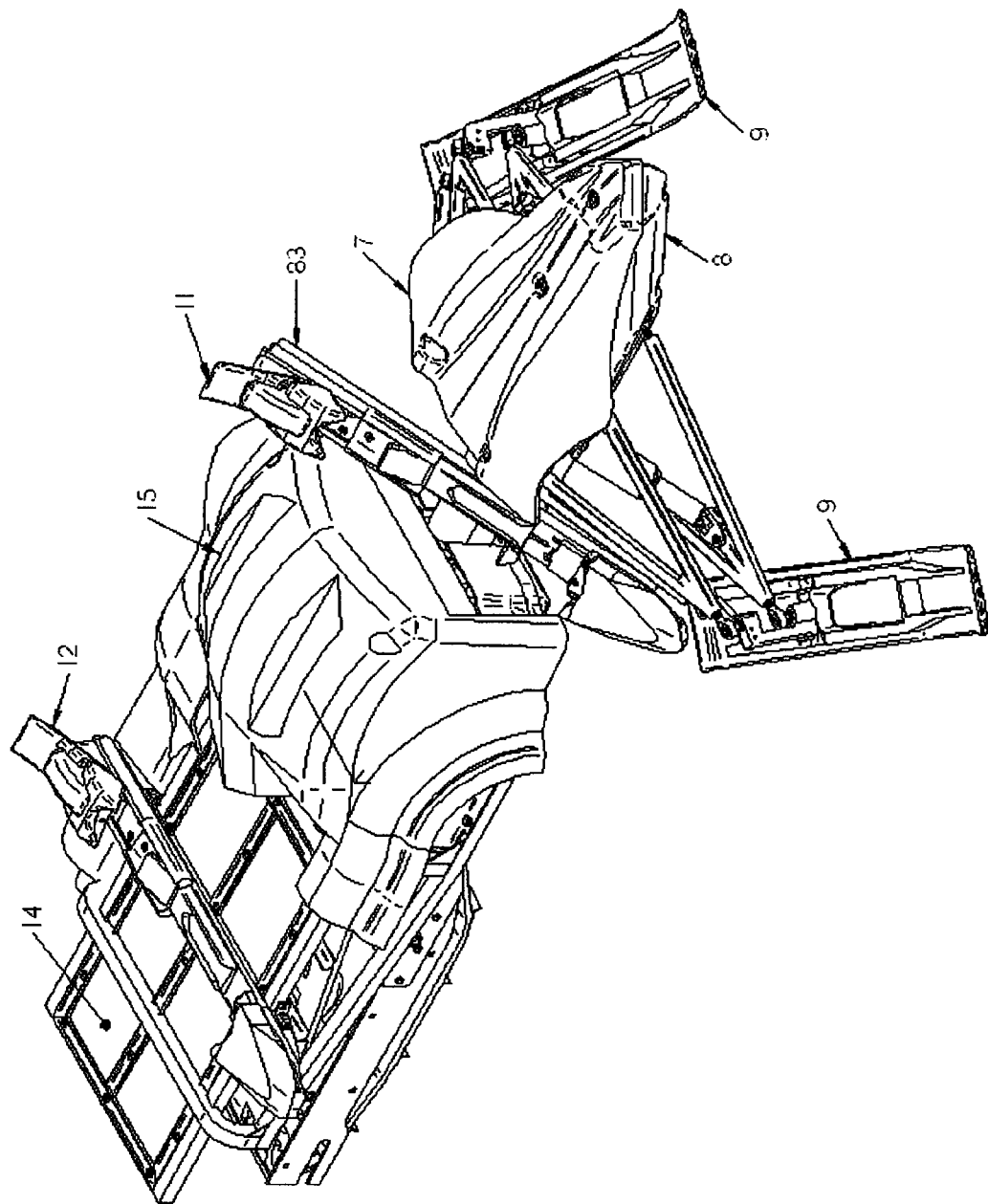
FIG. 3 illustrates a perspective view of a top of the powered vehicle of FIG. 1 with body work and turned skis.
Figure 12:
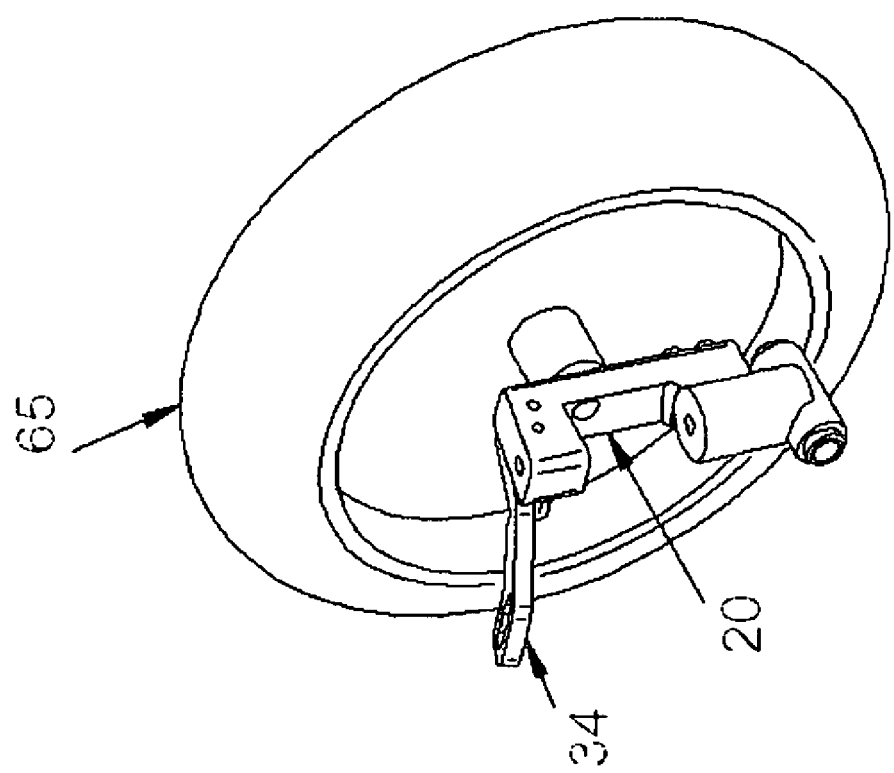
FIG. 12 illustrates a detail perspective view of an upright of the powered vehicle with a wheel in accordance with yet another embodiment of the disclosed invention.

As shown in FIG. 2, the powered vehicle 1 further includes two skis 9 and a front skid plate 8. The two skis 9, which may be of a similar design as those used on snowmobiles, are located in the front portion 2 of the powered vehicle 1. Optionally, wheels 65 (shown in FIG. 12) may replace the skis 9 so that the powered vehicle 1 may be used on surfaces other than snow. The skis 9 are optionally equipped with hoops (not shown) to facilitate moving the device manually, should the vehicle become lodged in the snow. The skis 9 may also optionally be equipped with carbides (not shown) to improve vehicle tracking and reduce ski 9 wear.

The front fender 7, the front skid plate 8, and the power unit skid plate 10 may be manufactured as one or more pieces and constructed from strong, tear and break-resistant, semi-rigid plastic similar to that commonly used on dirt bikes. Together, the power unit skid plate 10, the front skid plate 8, and the front fender 7 protect the user from the device, protect the device from foreign object damage, function as a third ski, and add aesthetic value to the powered vehicle 1. The front fender 7 may also include one or more handles (not shown), used to improve the user's stability, and especially to relieve forces from the user's body and legs during fast acceleration or deceleration.

The powered vehicle 1 of the present invention is steered by the rotation of the user's front booted foot held in place in a front binding mount 83 by the front safety release binding 11, as shown in FIG. 3, as the user alternately flexes and points his or her foot. FIG. 4 illustrates a detail perspective view of the steering mechanism of the powered vehicle 1 and FIG. 5 illustrates a close-up view of the steering mechanism of FIG. 4. As the user's front foot rotates, the rotation of the front binding mount 83 causes a binding mount tube 39 (FIG. 4) to rotate about a connecting tube 38. Binding mount tube bearings 75 are mounted in the front and rear of the binding mount tube 39 to facilitate the rotation of the binding mount tube 39 about the connecting tube 38. As understood by those of ordinary skill in the art, optionally, one or more sleeves or coatings of polytetrafluoroethylene (PTFE), or other low-friction material may replace the binding mount tube bearings 75. A foot mount ring gear 70 rigidly attached to the binding mount tube 39 also rotates as the user's front foot rotates. As more clearly shown in FIG. 5, as the foot mount ring gear 70 rotates, it causes a pinion gear 81 to rotate, which in-turn, causes a steering rack 79 to translate in a steering rack mount 78. The translation of the steering rack 79 causes steering rods 33 to move, thereby moving steering links 34 and rotating uprights 20 and the skis 9. Since both skis 9 are movably connected to the steering rack 79 through the upright 20, the steering link 34, and the steering rods 33, both skis are caused to rotate as the user's foot rotates. Rod ends 72 are used in many locations of the device to allow rotation in multiple axes, and for making adjustments to properties such as; ride height, camber, caster, turning ratio, Ackermann, and toe.

Those of ordinary skill in the art, after consideration of the above-summarized powered vehicle, will appreciate several advantageous features of the several embodiments of the disclosed invention. Non-limiting examples of these advantageous features include, but are not limited to, the fact that the steering mechanism just described will provide for increased maneuverability, functionality, and range of operation of the powered vehicle 1 because, among other reasons: (1) the front skis are caused to rotate by the rotation of the user's front foot, which allows the user to steer the device simply by leaning from side to side in a manner similar to snowboarding, surfing, or skateboarding; (2) the front skis steer the device and angle into turns, thereby making it impossible for the user to "catch an edge" and fall, as is common with snowboard devices; (3) the vehicle is wider in the front than snowboard-equipped vehicles, which tends to make it more stable; (4) the user's rear foot is located directly above the track mechanism, thereby allowing the user's weight to be distributed above the track as necessary to acquire traction—this is especially useful in deep powdery snow, icy conditions, and during hard acceleration; (5) the short distance between the track in the rear of the vehicle and the skis in the front of the vehicle, along with the compaction zone towards the front of the track mechanism further assist the vehicle's performance in deep, powdery snow; (6) the placement of the front foot support allows the user to place the majority of his or her weight towards the front of the device during turning, which increases the forces between the skis and the snow, thereby improving the turning ability of the vehicle; (7) the power unit of the vehicle, which encompasses a greater share of the vehicles total mass than do the front or rear sections of the vehicle, is located in the middle of the device and, with the user straddling the power unit in between his or her front and rear feet, the center of mass of the vehicle and user is located near the vertical geometric center line of the vehicle, thus minimizing the moment of inertia of the vehicle with rider and facilitating jumps and tricks that require the vehicle's rotation to be altered and controlled; and (8) the rider can further control the vehicle by altering the rotational speed of the track mechanism. If the track is decelerated, the user and vehicle will tend to pitch towards the skis. If the track is accelerated, the vehicle and user will tend to pitch towards the track. This ability to control a vehicle by accelerating or decelerating a rotating mass is common to dirt bikes and snowmobiles, and is particularly useful in turning the device, and in controlling the vehicle's rotation while the device is airborne.

The steering device of the powered vehicle 1 can alternately be moved by the rotation of the user's front foot roughly about a longitudinal axis of the tibia of the user's front leg and/or by the translation of the user's front foot along an axis transverse to the longitudinal axis of the powered vehicle 1. As understood by those of ordinary skill in the art, there exist numerous mechanical, electro-mechanical, and hydraulic means of coupling the motion of the user's front foot to the motion of the steering device, including, but not being limited to, the use of a pulley and belt system, in which a pulley rotated by the rotation of the user's front foot causes a belt to move, which in turn drives a pulley on the upright to rotate, thereby rotating the upright and turning the device; a chain and sprocket system (similar to the pulley system, only with a chain and sprockets instead of a belt and pulleys); a bevel gear and drive shaft system (a bevel gear, optionally mounted along the axis of the binding mount tube and caused to rotate by the rotation of the user's front foot, could cause a drive shaft to rotate. This driveshaft could extend from the bevel gear to the upright, where another bevel gear could be located which would engage the drive shaft. Thus, when the user's front foot rotates, the bevel gear mounted to the binding mount tube would rotate, thereby causing the driveshaft to rotate, which would cause the upright to rotate, thereby turning the vehicle.); and a device similar to that of a truck used to steer and mount wheels to skateboards (i.e., a system that would basically include removing the wheels from a skateboard truck, and attaching the skis in their place. The truck, in this case, would be mounted to the device such that the front foot could still be rotated independently of the rear. The skis or wheels would be mounted to the ends of the axle, while the user's foot would be located above the truck body. Similar to the function of skateboard trucks, when the user leans to one side or the other, the axle of the truck is caused to rotate about the kingpin of the truck, thereby causing the wheels or skis to turn). In skateboarding (as would likely be the same with this device) a rubber pad is commonly used to help keep the direction of travel of the wheels pointed in the same direction as the length of the board (the resistance offered by this pad helps the user to travel in a straight line when desired.) Other means of coupling the motion of the user's front foot to the motion of the steering device will be obvious to those skilled in the art after review of the subject matter being disclosed herein, and are intended to be included within the scope of the present invention. In addition to causing the skis to rotate, there exist numerous other ways of steering the device including a method of changing the curvature of the skis 9 or of components attached to the skis 9 in a manner similar to that employed by flexible runner mechanisms such as those used to turn sleds, or rotating turning fin(s) similar in concept to boat rudders, either as part of, or separate from the skis 9. (Any of these mechanisms can be controlled using a steering rack and pinion system, a pulley and belt system, a sprocket and chain system, or a bevel gear and drive shaft system.)

Figure 6:
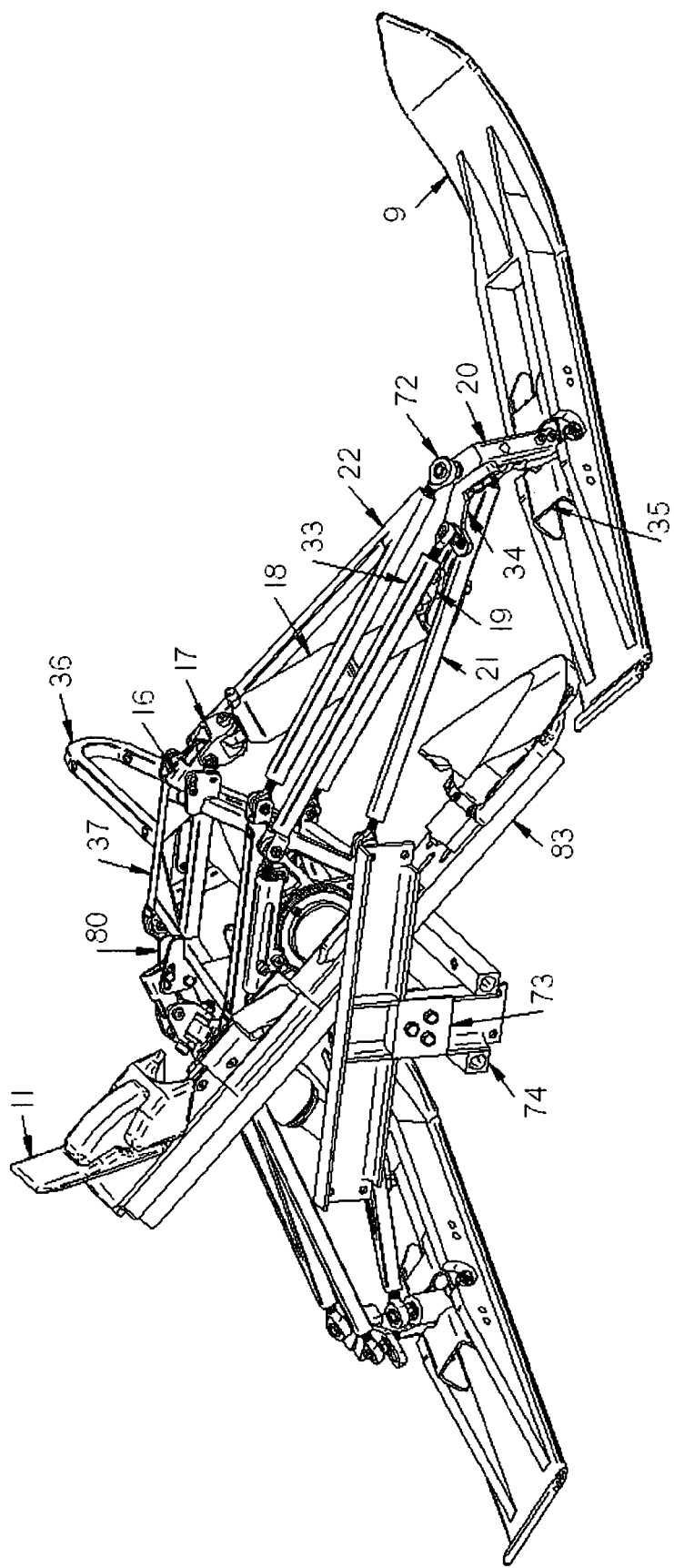
FIG. 6 illustrates a detail perspective view of a front suspension of the powered vehicle with turned skis and without body work in accordance with another embodiment of the disclosed invention.

Other embodiments of the invention just summarized are illustrated in FIGS. 6-14 and are presented here only as exemplary variations that are within the scope of the subject matter disclosed. FIG. 6 illustrates a detail perspective view of a front suspension of the powered vehicle with turned skis and without bodywork in accordance with another embodiment of the disclosed invention. As illustrated, the two skis 9 are moveably connected to an a-arm chassis 37 through uprights 20, which are connected to upper 22 and lower 21 a-arms. The upper a-arms 22 are partially or completely covered by the front fender 7 to protect the user in the case of a fall. A ski saddle 35 allows the ski to pivot about the upright 20. As understood by those of ordinary skill in the applicable arts, the suspension illustrated FIG. 6 is an independent suspension. However, alternate suspension are also within the scope of the disclosed invention, including, but not being limited to, dependent, semi-dependent, or interconnected suspensions.

Independent from each other, the skis 9 support the front portion 2 of the powered vehicle 1 through front air shocks 18 (FIG. 6), which offer a wide range of compression adjustability, rebound, and damping. Other shocks, such as coil-over type, may also be used. Upper 17 and lower 19 shock mounts rotate in two axes to prevent the front shocks 18 from binding or failing prematurely. Shock mount lever arm supports 80, rigidly connected to the a-arm chassis 37, allow the rotation of shock mount lever arms 16 to be adjusted, thereby changing the ride height of the powered vehicle 1 in the front portion 2 of the device. As those of ordinary skill will appreciate it, other methods of adjusting the ride height of the vehicle are known and can be used in the disclosed invention.

FIG. 7 illustrates a front view of the powered vehicle with bodywork and ride-height adjustment in accordance with yet another embodiment of the disclosed invention and FIG. 8 illustrates a close-up view of the ride-height adjustment of FIG. 7. In order to adjust the ride height in the front portion 2 of the device, shock mount lever arm pivot bolts 85 and shock mount lever arm positioning bolts 86, shown in FIGS. 7 and 8, are loosened, thereby allowing the shock mount lever arms 16 to be rotated about the shock mount lever arm pivot bolts 85. After adjusting to the desired ride height, the shock mount lever arm pivot bolts 85 and the shock mount lever arm positioning bolts 86 are tightened, thereby securing the position of the shock mount lever arms 16 within the shock mount lever arm supports 80.

Attached to the a-arm chassis 37, a front nose support 36 (FIGS. 4 and 6) provides structural rigidity for the front fender 7 and front skid plate 8, and optionally provides a mounting point for a support strap (not shown) configured to improve user stability and to relieve stresses from the user's body and legs. This support strap preferably connects to the user's belt and or harness at the user's waist or upper body, may be adjustable in length, and should give under large forces. The support strap should also be pliable enough to be comfortable for long rides and rough terrain, yet rigid enough to offer acceptable support. The support strap may have multiple loops connected along the length of the strap so that the user is able grasp onto one of the loops with their hand for additional support. An emergency strap release may also be incorporated into one or both of the safety release bindings, such that the strap is released from the device should one or both of the user's boots become disengaged from said binding(s). This strap release may also be activated by a button or lever on the hand-held control 6. The preferable release and connection point(s) for the support strap is in the vicinity of the front nose support 36. Optionally, the support strap may include carabiner-type devices on both ends of the strap to facilitate the straps attachment and detachment from the user's harness, and from the powered vehicle 1.

In another embodiment of the powered vehicle 1 the front portion 2 is removably attached to a chassis 43 (identified in FIG. 9) of the powered vehicle 1, and can be separated from the chassis 43 by removing one or more bolts in the a-arm-to-chassis support 73 (FIG. 6). The front portion 2 may also be designed in such a manner that it can be easily and securely stacked on top of the body 15 and may incorporate one or more lifting handles to facilitate transport. A-arm front 77 and rear 76 plates (shown in FIG. 4) are rigidly attached to the connecting tube 38, which is rigidly, but removably connected to the a-arm-to-chassis support 73. The rigid connection between the chassis 43 and the a-arm chassis 37 is strengthened by two chassis-to-front suspension supports 74 (FIG. 6), which also provide structural rigidity for the front skid plate 8.

Preferably constructed from strong, tear and break-resistant, semi-rigid plastic similar to that commonly used on dirt bikes, the body 15 of the present invention protects the user from the various hazards of the vehicle, including, but not limited to: moving parts, high temperatures, and/or electrical equipment. Additionally, the body 15 protects the device from the user, the environment, and from foreign objects, as well as adding aesthetic value to the vehicle. The body 15 may also include one or more handles, used to improve the user's stability, and especially to relieve forces from the user's body and legs during fast acceleration or deceleration.

Preferably constructed from metal or strong, tear and break-resistant, semi-rigid plastic similar to that commonly used on dirt bikes; a rear fender well 14 (shown in FIG. 3) of the present invention protects the user from the various hazards of the vehicle, including but not limited to: moving parts and airborne debris, set into motion by the movement of the track 13. Additionally, the rear fender well 14 protects the device from the user, the environment, and from foreign objects, as well as adding aesthetic value to the vehicle. The rear fender 14 may or may not be incorporated into the body 15 and may include one or more handles, used to improve the user's stability, and especially to relieve forces from the user's body and legs during fast acceleration or deceleration. Non-slip surfaces, with or without padding, may be used on top of the front fender 7, the body 15, and/or rear the rear fender well 14. Any of these components may include multiple parts to perform their specific function.

Figure 9:
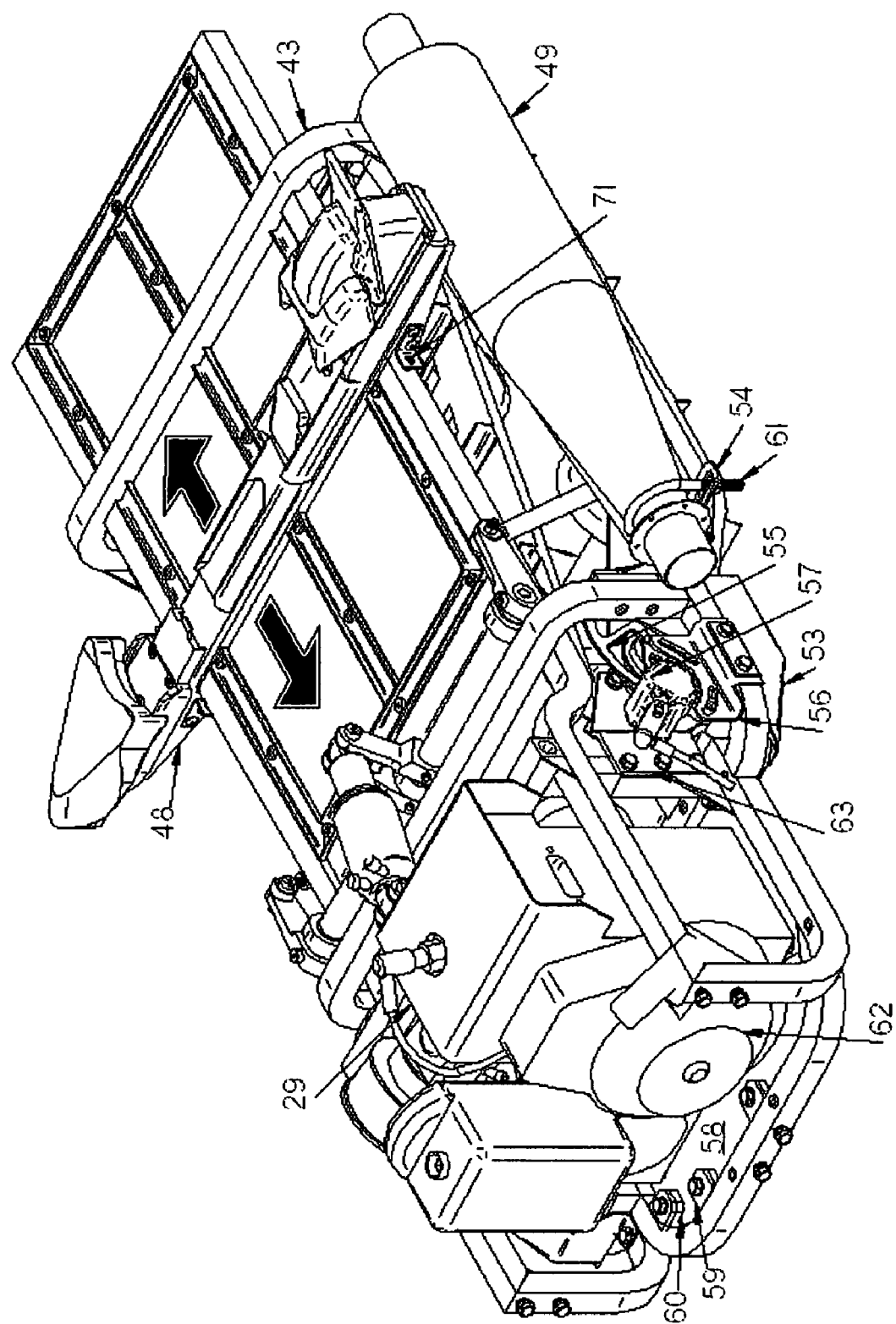
FIG. 9 illustrates a detail perspective view of a brake side of a power unit and track of the powered vehicle without body work in accordance with yet another embodiment of the disclosed invention.
Figure 10:
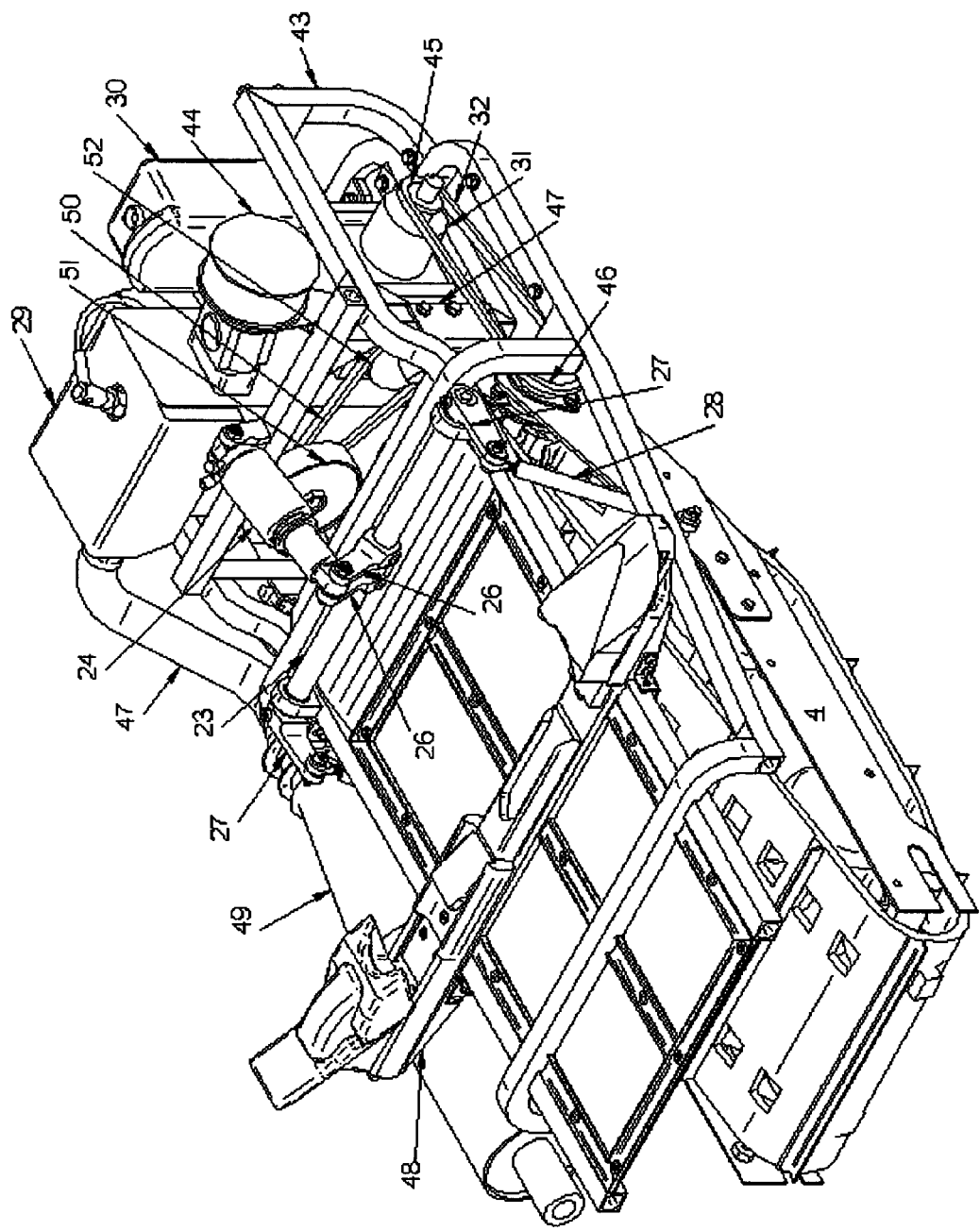
FIG. 10 illustrates a detail perspective view of a drive side of the power unit and track of the powered vehicle of the FIG. 9.

FIG. 9 illustrates a detail perspective view of a brake side of a power unit and track of the powered vehicle without body work in accordance with yet another embodiment of the disclosed invention and FIG. 10 illustrates a detail perspective view of a drive side of the power unit and track of the powered vehicle of the FIG. 9. As shown in FIG. 9, a motor 29, mounted to the chassis 43 via a motor mounting plate 58, provides the power necessary to rotate the track 13 and move the powered vehicle 1. The motor mounting plate 58 is vibration-isolated from the chassis 43 through the use of vibration dampeners 60, which connect motor mounting plate tabs 59 to the motor mounting plate 58. There are other ways of providing for a secure, vibration-dampened connection between the motor 29 and the chassis 43, which will be obvious to those skilled in the art. In one embodiment, the motor 29 is a 120 cc, 2-stroke engine. A pull-starter 62 or electric starter (not shown) may be used to start the motor 29. Although the mentioned motor is suitable for use, another motor may be used that includes a lower profile with an output shaft located such that a right-angle gearbox 31 (shown in FIG. 10) is no longer necessary. As understood by those of ordinary skill in the art, there are many other motors that may be suitable for powering the vehicle of the present invention, including but not limited to: a two-stroke engine, a four-stroke engine, a rotary engine, a diesel engine, a gas-turbine, a MYT™-type engine, an electric motor, a compressed gas motor, or a steam engine. Additionally, the motor 29 may include performance enhancements such as a turbocharger, supercharger, fuel injection, and/or variable valve timing.

The motor 29 of the present invention is provided with an exhaust system including a header 47, a muffler 49, a muffler support bracket 54, and a clamping device 61, as shown in FIG. 9 and FIG. 10. An additional muffler support (not shown) is provided near the rear of the chassis 43. A small, high-performance air filter 44 (shown in FIG. 10) is connected to the intake of the motor 29. A fuel tank 30, although shown as a predominately rectangular container located within the power unit 3 of the present invention, may be larger, of a different shape, and possibly integrated with the body work of the powered vehicle 1.

Connected to the drive shaft of the motor 29 is a centrifugal clutch 51 with an integral drive sprocket (not shown) connected by a gearbox drive chain 50 to an input sprocket 52 of the right-angle gearbox 31. A track drive chain 32 connects an output sprocket 45 of the right-angle gearbox 31 to a track drive sprocket 46. A chain guard 82 (shown in FIG. 2) covers the track drive chain 32 and sprockets 45 and 46. Optionally, the power transmission system may incorporate one or more of the following: a continuously variable transmission, a pulley, a belt, a rigid drive shaft, and/or a flexible-drive shaft.

Figure 11:
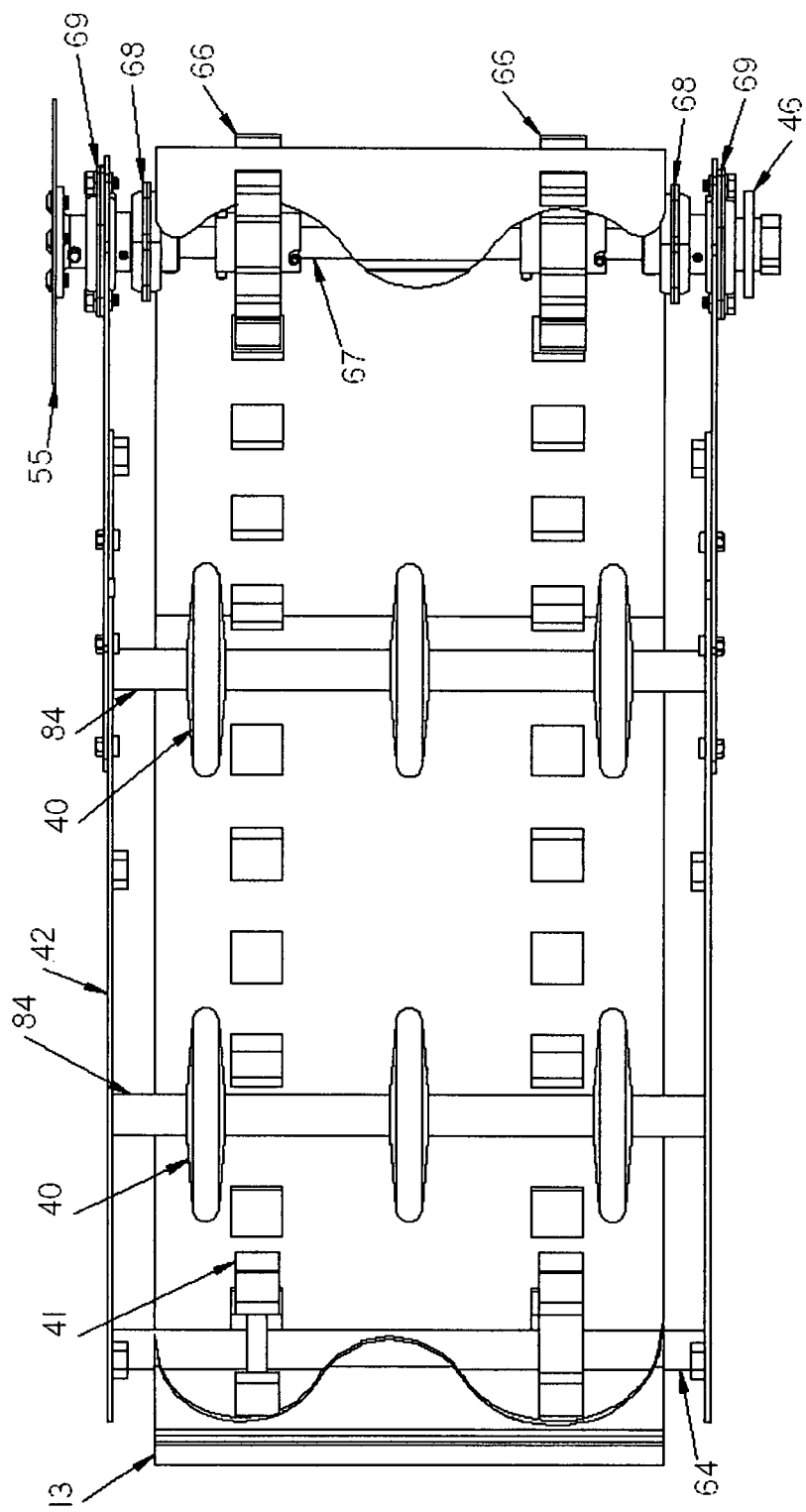
FIG. 11 illustrates a cutaway top view showing a track assembly of a powered vehicle in accordance with yet another embodiment of the disclosed invention.

FIG. 11 illustrates a cutaway top view showing a track assembly of a powered vehicle in accordance with yet another embodiment of the disclosed invention. As shown, the track drive sprocket 46 is connected to a track drive shaft 67. A track gear 46 (shown in FIG. 11), connected to the track drive shaft 67, complete the transfer of power and torque from the motor 29 to the track 13. Inboard bearings 68, connected to track drive shaft tabs 63 (FIG. 9), and the track drive shaft 67 form a rotating connection between the track mechanism 4 and the chassis 43 of the powered vehicle 1. Outboard bearings 69, connected to undercarriage supports 42, form a rotating connection between the track drive shaft 67 and the track mechanism 4. Idler wheels 40, mounted to idler shafts 84, distribute the load of the vehicle on the surface, and maintain the profile of the track 13. Track tensioning gears 41, mounted to a track-tensioning shaft 64, are used to adjust and maintain the proper tension of the track 13.

The track mechanism 4 incorporates a suspension that includes two connecting rods 28, two outboard lever arms 27, a rear suspension torsion bar 23, two inboard lever arms 26, two inboard shock supports 25, and a rear air shock 24 with adjustable compression, rebound, and damping, as shown in FIG. 10. Other shocks, such as coil-over type, may also be used. By rotating the connecting rods 28, the ride height of the rear of the powered vehicle 1 can be adjusted. In one embodiment of the invention, the track mechanism 4 may be a slightly modified track assembly from a children's snowmobile; however, as appreciated by those of ordinary skill, the powered vehicle 1 may use a custom-built track with an internal suspension, as is the industry standard for snowmobiles. The track 13 may be similar in design to a snowmobile track, and may be manufactured, at least in part, from an elastomer material and/or metal, and may include fiber reinforcement and studs for use on ice.

As shown in FIG. 9, a brake caliper 57, mounted to the chassis 43 of the vehicle through a brake caliper mount 56, is actuated by the compression of a lever on the hand-held control 6 in order to slow and/or stop the powered vehicle 1 by clamping onto the inner and outer sides of a brake rotor 55. Although a hydraulic brake caliper is illustrated, a manual caliper or drum-type braking system may also be used. A disk brake guard 53, the rear fender 14 and/or the body 15, protects the brake rotor 55.

In order to adjust the user's stance, a rear binding mount 48 can be easily translated in the directions shown by the arrows in FIG. 9. To adjust the rear binding mount 48, set screws 71 are first loosened. The binding mount 48 is then moved, and the set screws 71 are tightened again. A quick-turn knob or other quick-release device may also be used to adjust the user's stance. Both front and rear bindings can be reversed in direction, thereby allowing the user to ride the vehicle with either their left or right foot in front.

Figure 13:
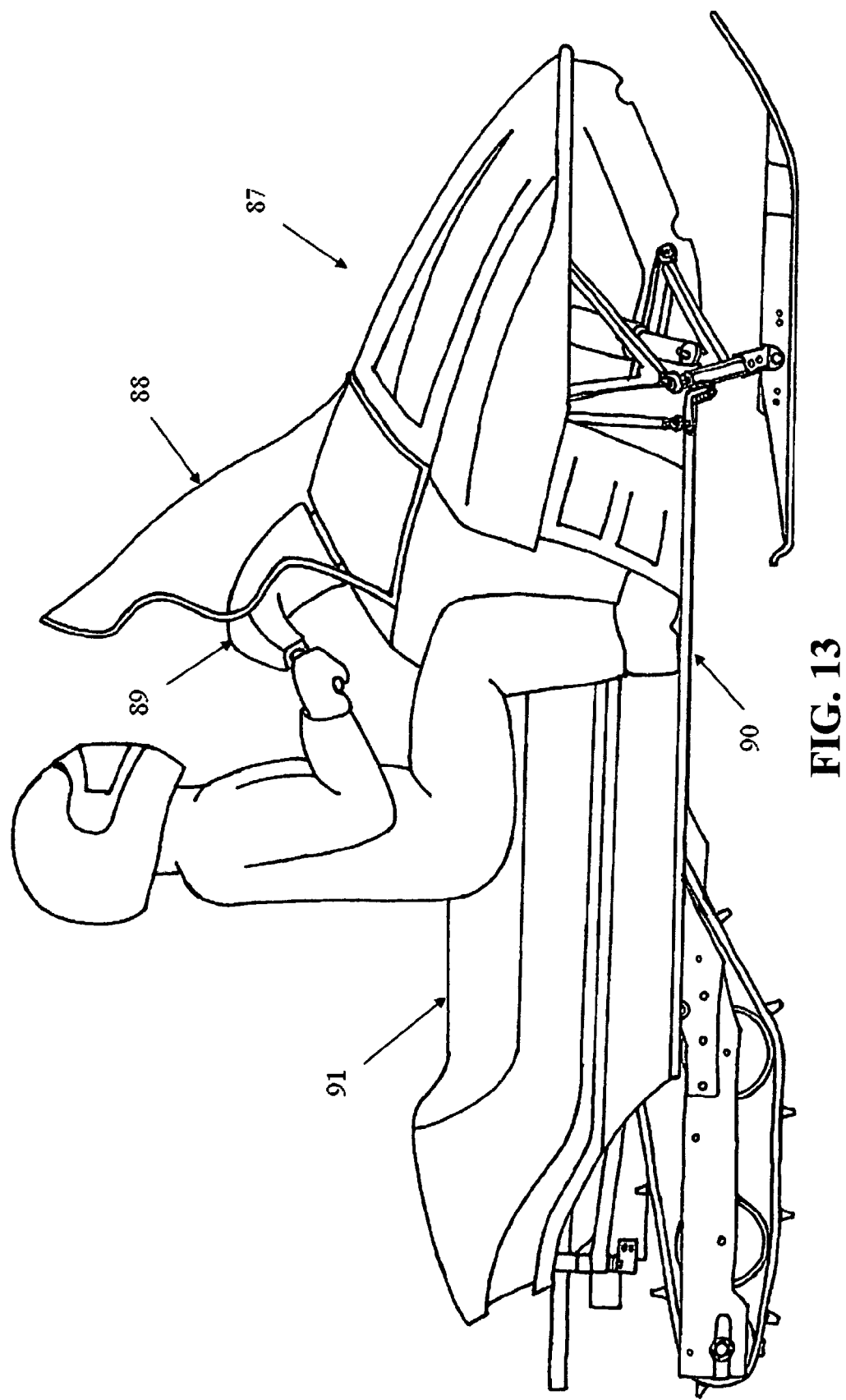
FIG. 13 illustrates a side view of a snowmobile conversion kit in accordance with yet another embodiment of the disclosed invention.
Figure 14:
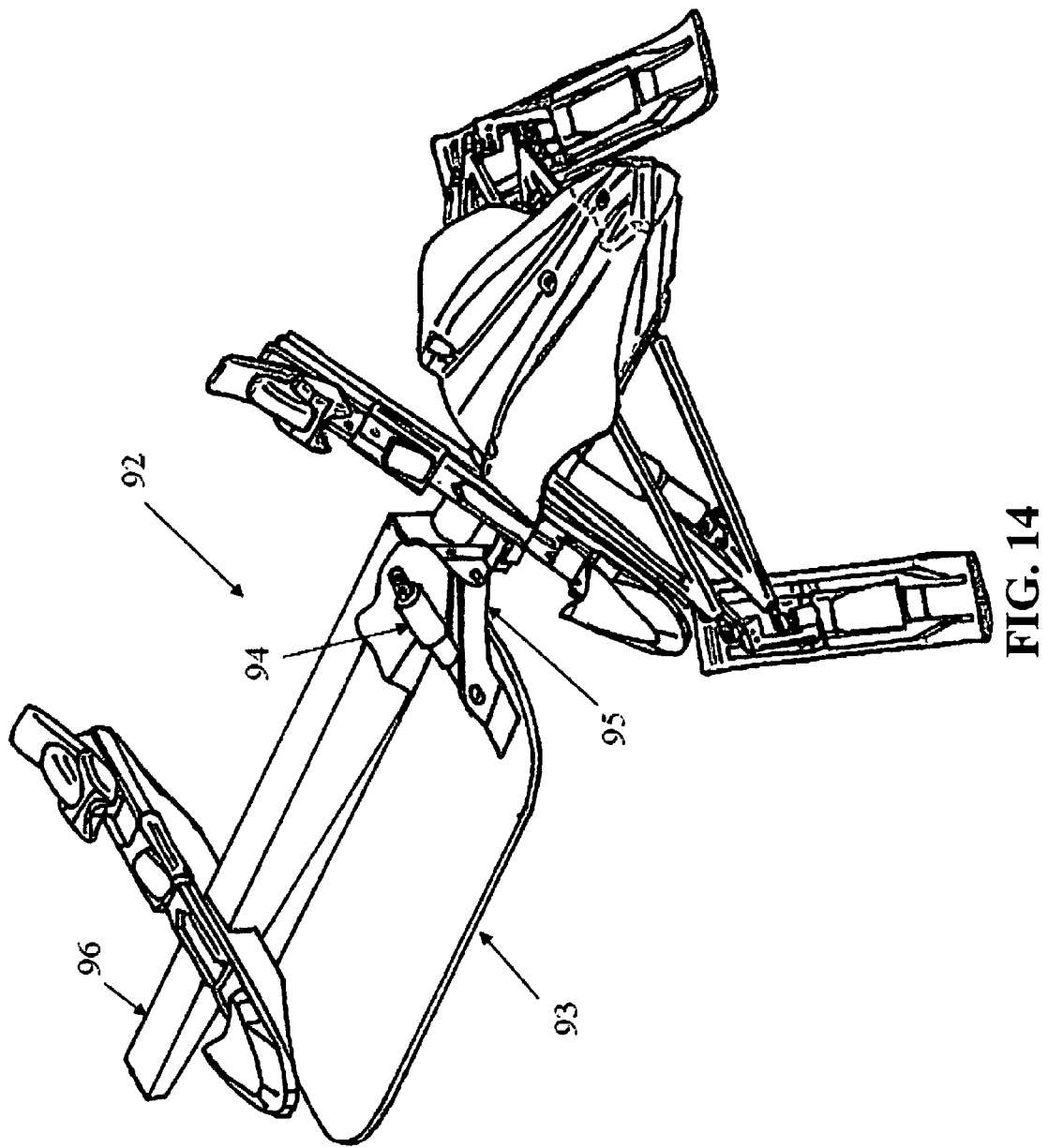
FIG. 14 illustrates a perspective view of a downhill attachment in accordance with yet another embodiment of the disclosed.

FIG. 13 illustrates a side view of a snowmobile conversion kit in accordance with yet another embodiment of the disclosed invention that may be secured to the top of the powered vehicle 1, thereby allowing a user to ride the vehicle 1 in a predominately seated position. With the snowmobile conversion kit 87 attached, the user's body rests on a seat 91, while the user's feet rest on foot rests 90. Throttle, braking, and steering are all controlled with a handle bar 89. The user's body is partially shielded from the environment by a windshield 88. A head light (not shown), speedometer (not shown), tachometer (not shown), fuel gauge (not shown), engine starter (not shown), heater (not shown), stereo (not shown), as well as many other accessories may be incorporated into the snowmobile conversion kit 87, and are intended to be included within the scope of the present invention. FIG. 14 illustrates a perspective view of a downhill attachment in accordance with yet another embodiment of the disclosed invention. As shown, a downhill attachment 92, which can be used as a replacement for the chassis 43 and track mechanism 4 of the powered vehicle 1, can convert the device into a non-powered snow vehicle for predominately downhill use. A ski board 93, optionally incorporating a braking mechanism (not shown), is attached to a rear binding support 96 of the device via a lever arm 95 and a shock 94. In addition, as those of ordinary skill will appreciate it, with the several embodiments of the disclosed invention, it is possible for one to pull a sled to be used for storage and/or for rescue. The sled would include one or more skis and an enclosed or open (or combination thereof) storage area. A device similar to a ball-hitch could be used to couple the sled to the vehicle.

Recapitulating, the several embodiments of the disclosed invention provide a unique recreational vehicle in the form of a powered skied or wheeled vehicle for traversing grass, sand, salt, dirt, pavement, and snow/ice covered surfaces. As understood by those of ordinary skill in the applicable arts, the recreational vehicle may be ridden in a predominately standing or crouching position similar to that used while riding a snowboard, skateboard, wakeboard or surfboard. As disclosed hereinabove, the vehicle may incorporate one or more skis or wheels near the front of the device, and a power unit near the rear of the device. The front ski(s) or wheels may be connected to the frame of the device through a front suspension, which may or may not incorporate one or more shocks. The user is able to steer the device by moving his or her front foot, thereby imparting motion to a steering device, which alters the vehicle's direction of travel. In an embodiment of the vehicle whereby the steering device is caused to move by the rotation of the user's front foot as it is alternately flexed and pointed, the user is able to intuitively steer the device by leaning into turns in a manner similar to that used while snowboarding, skateboarding, wakeboarding, or surfing. The power unit of the recreational vehicle includes a motor with an output shaft and a track mechanism. Alternately; the track mechanism may be replaced with one or more driven wheels. The motor output shaft transmits power to the track mechanism, which in turn delivers power to the grass, sand, salt, dirt, pavement, and snow/ice. The track mechanism is connected to the vehicle's frame, and optionally incorporates a suspension mechanism with one or more shocks. The user's rear foot is positioned towards the rear of the device, above the track mechanism. Both of the user's feet are secured to the device through the use of boots and safety-release bindings. Hand controls are used to manually release the bindings, and to modulate the braking and throttle of the power unit.

A method of steering a recreational vehicle is also within the scope of the disclosed invention. Such a method includes moving a first foot support of the recreational vehicle, the first foot support being connected to a steering mechanism of the recreational vehicle. In such methods, the moving may comprise either rotating the first foot support about an axis substantially perpendicular to a longitudinal axis of a steering rack of the steering mechanism or translating the first foot support along an axis substantially parallel to a longitudinal axis of a steering rack of the steering mechanism.

The constructions and arrangements of the invention, as described herein and shown in the appended figures, are illustrative only. Although only a few embodiments of the invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the appended claims.

Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the embodiments of the invention as expressed in the appended claims.

What is claimed is:

1. A recreational vehicle, comprising:
    a front portion;
    a body connected to the front portion;
    a track mechanism disposed in the body;
    a first foot support disposed on the body substantially above the track mechanism, the first foot support being configured to support a foot of a user of the recreational vehicle;
    a steering mechanism disposed in the front portion; and
    a second foot support disposed between the front portion and the body, the second foot support being configured to support the other foot of the user, wherein the steering mechanism is configured to be actuated by a motion of the second foot support when the user leans in a direction substantially perpendicular to a longitudinal axis of the recreational vehicle.

2. The recreational vehicle according to claim 1, wherein the steering mechanism comprises a steering rack connected to the second foot support.

3. The recreational vehicle according to claim 1, wherein the motion is a rotational motion substantially about the longitudinal axis of the recreational vehicle.

4. The recreational vehicle according to claim 2, further comprising:
    a binding mount tube connected to the second foot support;
    a ring gear connected to the binding mount tube; and
    a pinion gear coupled to the ring gear and the steering rack.

5. The recreational vehicle according to claim 4, further comprising:
    at least one steering rod connected to the steering rack; and
    at least one ski connected to the steering rod, wherein the at least one ski is steered by the motion of the second foot support.

6. The recreational vehicle according to claim 4, further comprising:
    at least one steering rod connected to the steering rack; and
    at least one wheel connected to the steering rod, wherein the at least one wheel is steered by the motion of the second foot support.

7. The recreational vehicle according to claim 5, wherein a curvature of the at least one ski changes by the motion of the second foot support.

8. The recreational vehicle according to claim 5, wherein a curvature of the at least one ski and an angular position of a component attached to the at least one ski change by the motion of the second foot support.

9. The recreational vehicle according to claim 1, wherein the second foot support is connected to the steering device by a mechanism selected from the group comprising a mechanical mechanism, an electro-mechanical mechanism, and a hydraulic mechanism.

10. The recreational vehicle according to claim 1, wherein the second foot support is connected to the steering device by a mechanism selected from the group comprising a rack-and-pinion mechanism, a pulley-and-belt mechanism, a chain-and-sprocket mechanism, a bevel-gear-and-drive-shaft mechanism, and a skateboard-truck mechanism.

11. The recreational vehicle according to claim 1, further comprising:

a motor disposed in the body, the motor being connected to the track mechanism.

12. The recreational vehicle according to claim 1, wherein the track mechanism is a snowmobile track mechanism.

13. The recreational vehicle according to claim 1, wherein a ride height of the recreational vehicle is adjustable.

14. The recreational vehicle according to claim 1, wherein the first foot support, the second foot support, or combinations thereof are adjustable along the longitudinal axis of the vehicle.

15. The recreational vehicle according to claim 1, further comprising:
a control unit connected to the recreational vehicle.

16. The recreational vehicle according to claim 15, further comprising:
a brake unit;
a binding release unit; and
a motor having a throttle, the motor being disposed in the body, wherein the control unit is connected to the recreational vehicle via a flexible cable and is configured to control the brake unit, the binding release unit, the throttle, or combinations thereof.

17. The recreational vehicle according to claim 15, further comprising:
a brake unit;
a binding release unit; and
a motor having a throttle, the motor being disposed in the body, wherein the control unit is connected to the recreational vehicle via a wireless connection and is configured to control the brake unit, the binding release unit, the throttle, or combinations thereof.

18. The recreational vehicle according to claim 1, wherein the body is removably connected to the front portion.

19. The recreational vehicle according to claim 11, further comprising:
a snowmobile conversion kit secured to a top portion of the recreational vehicle so as to allow a user to ride the recreational vehicle in a predominantly seated position.

20. The recreational vehicle according to claim 1, wherein the first foot support is disposed on the body in a region defined by a planar projection of the track mechanism to a horizontal plane.

21. A recreational vehicle, comprising:
a front portion;
a body connected to the front portion;
a track mechanism disposed in the body;
a first foot support disposed on the body substantially above the track mechanism;
a steering mechanism disposed in the front portion, wherein the steering mechanism comprises a steering rack;
a second foot support disposed between the front portion and the body, the steering rack being connected to the second foot support and being steered by a motion of the second foot support;
a binding mount tube connected to the second foot support;
a ring gear connected to the binding mount tube; and
a pinion gear coupled to the ring gear and the steering rack.

22. The recreational vehicle according to claim 21, further comprising:
at least one steering rod connected to the steering rack; and
at least one ski connected to the steering rod, wherein the at least one ski is steered by the motion of the second foot support.

23. The recreational vehicle according to claim 21, further comprising:
at least one steering rod connected to the steering rack; and
at least one wheel connected to the steering rod, wherein the at least one wheel is steered by the motion of the second foot support.

24. The recreational vehicle according to claim 22, wherein a curvature of the at least one ski changes by the motion of the second foot support.

25. The recreational vehicle according to claim 22, wherein a curvature of the at least one ski and an angular position of a component attached to the at least one ski change by the motion of the second foot support.

26. A recreational vehicle, comprising:
a front portion;
a body connected to the front portion;
a track mechanism disposed in the body;
a first foot support disposed on the body substantially above the track mechanism in a region defined by a planar projection of the track mechanism to a horizontal plane, the first foot support being configured to support a foot of a user of the recreational vehicle;
steering mechanism disposed in the front portion;
a second foot support disposed between the front portion and the body, the second foot support being configured to support the other foot of the user; and
a motor disposed in an end portion of the body between the first and second foot supports, wherein the steering mechanism is configured to be actuated by a motion of the second foot support when the user leans in a direction substantially perpendicular to a longitudinal axis of the recreational vehicle.

27. The recreational vehicle according to claim 26, further comprising:
a control unit connected to the recreational vehicle.

28. The recreational vehicle according to claim 27, further comprising:
a brake unit; and
a binding release unit, wherein the control unit is connected to the recreational vehicle via a flexible cable and is configured to control the brake unit, the binding release unit, a throttle of the motor, or combinations thereof.

29. The recreational vehicle according to claim 27, further comprising:
a brake unit; and
a binding release unit, wherein the control unit is connected to the recreational vehicle via a wireless connection and is configured to control the brake unit, the binding release unit, a throttle of the motor, or combinations thereof.

30. The recreational vehicle according to claim 26, wherein the steering mechanism comprises a steering rack connected to the second foot support.

31. The recreational vehicle according to claim 26, wherein the motion is a rotational motion substantially about the longitudinal axis of recreational vehicle.

32. The recreational vehicle according to claim 30, further compromising:
a binding mount tube connected to the second foot support;
a ring gear connected to the binding mount tube; and
a pinion gear coupled to the ring gear and the steering rack.

33. The recreational vehicle according to claim 32, further comprising:
at least one steering rod connected to the steering rack; and
at least one ski or one wheel connected to the steering rod, wherein the at least one ski or the at least one wheel is steered by the motion of the second foot support.

* * * * *